April 4, 1939.  S. J. STRID  2,152,776

FLOOR CLIP

Filed Feb. 3, 1939

INVENTOR.
SVEN J. STRID
BY Mann, Brown & Co.
ATTORNEYS.

Patented Apr. 4, 1939

2,152,776

UNITED STATES PATENT OFFICE 2,152,776

FLOOR CLIP

Sven J. Strid, Chicago, Ill., assignor to T & S Corporation, Chicago, Ill., a corporation of Illinois Application February 3, 1939, Serial No. 254,489

6 Claims. (Cl. 189—35)

This invention relates to clips for use on railway cars and more particularly to floor clips or clips for holding floor boards in position on their supports.

One of the objects of the invention is the provision of a new and improved clip so constructed that when in operative position, it is prevented from rotating and is provided with integral means for retaining the nut on the attaching bolt.

A further object of the invention is the provision of a new and improved floor clip having novel integral means that is adapted to be bent to nut holding position with a single stroke of a hammer or the like.

A further object of the invention is the provision of a new and improved combined floor clip and nut lock that is simple in construction, inexpensive to manufacture, easily applied and that is efficient in use.

Other and further objects and advantages of the invention will appear from the following description taken in connection with the accompanying drawing in which—

Figure 1:
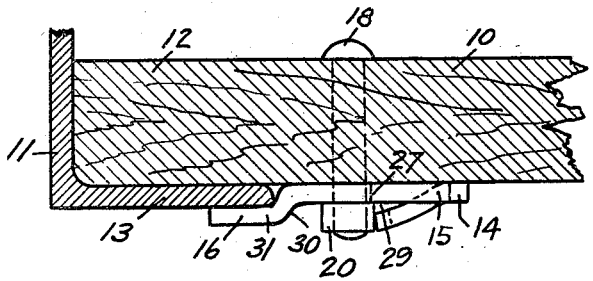
Fig. 1 is a transverse section of a portion of a railway car showing the invention in position therein, with parts broken away.

It has been proposed, in the construction of floor clips, to provide a tongue along the edge of the clip which is adapted to be bent downwardly from the clip body alongside the nut after it has been applied for locking the same against its removal. This arrangement is objectionable because it requires the use of a tapered bar or lever for insertion between the tongue and clip body for bending the nut locking means downwardly alongside the nut. It has also been proposed to provide the floor clip with a tongue, the attaching part of which is adjacent the nut and the end of which is provided with a recess for engaging the nut, said tongue being adapted to be bent over on itself to cause the recess therein to engage the nut for locking the same against turning. But this is objectionable also because in bending the tongue, the loop will not be properly located and the nut holding portion will be either too long or too short for properly engaging the nut. Other means comprising the use of a two part construction have also been proposed but these too are objectionable as being troublesome to apply and requiring too much time to properly attach.

The present invention seeks to remedy these defects by the provision of a combined clip and nut lock in which the clip has an integral tongue that is so positioned that when the nut is screwed home, the tongue may be driven to nut holding position by a single blow of the hammer and, when in position, the end of the tongue will be parallel with and substantially in engagement with a side face of the nut.

Referring now to the drawing, the reference character 10 designates a portion of a railway car having a side sill 11 and a floor board 12. The side sill has a laterally extending flange 13 to which the floor board 12 is adapted to be attached by means of a clip 14. The clip 14 comprises a plate which may be, and preferably is, rectangular having a body portion 15 at one end and an offset portion 16 at the other. The body portion has an opening 17 therethrough for receiving the attaching bolt 18. The offset portion 16 which, for convenience of description will be considered as extending downwardly, is adapted to engage beneath the flange 13 when the clip is in floor board holding position.

Suitable means are provided on the body portion 15 for holding the nut in adjusted position when the clip is applied. As shown, a tongue 19 preferably, though not necessarily, has its longitudinal axis coincident with, or parallel to, the longitudinal axis of the clip and diameter of the hole 17. The tongue is preferably, though not necessarily, enlarged at its free end as at 21 and tapers outwardly to an intermediate point 22, as shown in Fig. 3. From the intermediate point 22, the edges of the tongue diverge toward the base as at 23. The tongue is formed by slitting the metal and then bending the tongue portion downwardly to the position shown in Fig. 2. The widened base portion 23 will prevent the tongue from forming a sharp bend at the base so that a long bend, as shown at 24 in Fig. 2, is formed in the restricted portion when the tongue is bent downwardly. The tongue, at its free end, is bent slightly upwardly as shown at 25 so that when the tongue is bent up to the position shown in Fig. 1, the outer face 26 of the tongue will be parallel with, and in close proximity to, a side face of the nut, as shown in Fig. 1.

Figure 2:
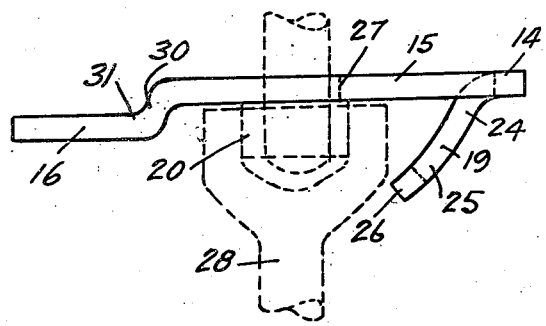
Fig. 2 is a side elevation of the floor clip showing the position of a wrench in attaching or detaching the nut, in dotted lines.
Figure 3:
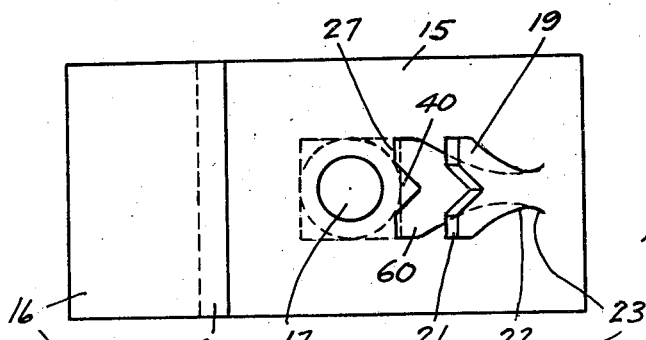
Fig. 3 is a bottom plan view of the floor clip before it is attached, showing the nut in one position, in dotted lines.

In order that the outer face 26 of the tongue, when it is bent to the position shown in Fig. 1, shall be in close proximity to the face of the nut 20, the inner portion 27 of the slit is located slightly inwardly of the outer face of the nut 20, as shown more clearly in Figs. 1 and 2 of the drawing. The bend 30 between the body 15 of the clip and the offset portion 16 is somewhat sharp to form a shoulder 31 that is adapted to engage the inner edge of the flange 13 of the side sill for preventing turning of the clip when the same is applied. Preferably, the opening 17 for the bolt is so located that the shoulder 31 will be in engagement with the flange 13 when the clip is applied.

In the manufacture of the plate, the tongue is bent to the position shown in Fig. 2 and to the form shown in that figure so that the nut 20 may be turned to position by a conventional wrench such as the socket wrench 28, shown in dotted lines in Fig. 2. After the nut has been turned home, the wrench is removed and by a single blow of a hammer, the tongue 19 is bent to the position shown in Fig. 1. By means of this arrangement, the plate 14 may be made of ferrous material of low carbon content as soft iron or mild steel, it not being necessary that the tongue shall be resilient. This is considered an important feature of the invention. Should it become necessary to remove the nut, this may be done by the aid of a proper lever such as a screwdriver, or the like, inserted in the space 29 between the upper end of the tongue and the lower surface of the body portion of the clip.

Figure 4:
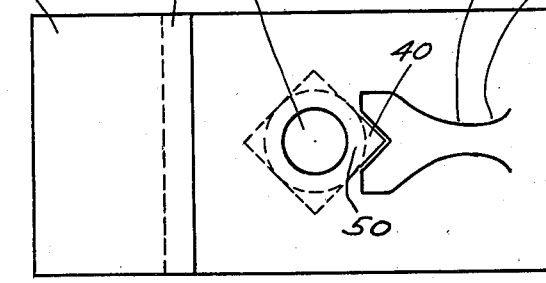
Fig. 4 is a view similar to Fig. 3 but showing the tongue in nut holding position, the nut being shown in dotted lines and turned one-eighth of a turn from its position in Fig. 3.

In applying a square nut, as shown on the drawing, it is not uncommon for the same to be drawn sufficiently tight when the sides thereof are at an acute angle to the center line of the tongue. It may be too tight to be turned further and to turn it back to a position in which the side adjacent the tongue would be perpendicular thereto would loosen the nut. In order that the nut may be locked in this partially rotated angular position, the tongue 19 is provided on its nut engaging end with a notch for receiving a corner of the nut so that the nut may be locked in any one of eight positions during each rotation. In other words, when it is in one position to be engaged by the end of the tongue, as shown in Fig. 1, it may be turned through one-eighth of a turn and locked as shown in Fig. 4. This notch is formed when the stock is slitted to form the tongue, thus leaving an angular projection 40 on the connecting portion 50 of the stock between the opening 17 and the opening 60 formed by the tongue 19. This additonal material greatly strengthens this connecting portion over what it would be were the edge 27 straight across the opening 60.

While I have shown the clip as being used for holding the floor boards of a railway car in position on their supports, it is understood that this is by way of example only as the clip may be used in numerous other devices for performing the same or similar functions or for clampingly attaching one member to another.

This is a continuation in part of my application, Serial Number 210,944, filed May 31, 1938, and allowed January 27, 1939.

It is thought from the foregoing, taken in connection with the accompanying drawing, that the construction and operation of my device will be apparent to those skilled in the art and that changes in size, shape, proportions and details of construction may be made without departing from the spirit and scope of the appended claim.

I claim:

1. A floor clip comprising a metal body portion having an opening therethrough adapted to receive a bolt and provided at one end with a portion adapted to lap a frame member and clamp a floor board thereto, and a tongue integral with and struck up from a recess in the clip extending from a tongue base line in a portion of the clip relatively remote from said opening to a line relatively close to said opening, leaving a portion of metal between said opening and recess, said tongue extending approximately diagonally from said base line toward the axis of said opening and terminating at its free end in an edge including a straight line shoulder approximately normal to the length of the tongue and spaced lengthwise of the clip far enough from the edge of the opening to permit a nut to be turned on said bolt by a socket wrench or the like, whereby said tongue is adapted to be bent toward the clip by a blow from a hammer or the like to bring said shoulder into locking relation with a side of said nut.

2. A floor clip comprising a metal body portion adapted to engage a floor board and an offset portion at one end of the body portion adapted to lap a frame member and cooperate with the body portion in clamping said floor board to the frame member, said body portion having an opening therethrough adapted to receive a bolt, and a tongue integral with and struck up from a recess in the body portion on the side of the opening remote from the offset portion and extending from a tongue base line in said body portion relatively remote from said opening to a line in said body portion relatively close to said opening, leaving a portion of metal between said opening and recess, said tongue extending approximately diagonally from said base line toward the axis of said opening and terminating at its free end in an edge including a straight line shoulder approximately normal to the length of the tongue and spaced lengthwise of the clip far enough from the edge of the opening to permit a nut to be turned on said bolt by a socket wrench or the like, whereby said tongue is adapted to be bent toward the body portion by a blow from a hammer or the like to bring said shoulder into locking relation with a side of said nut.

3. A floor clip comprising a body portion having an opening therethrough adapted to receive a bolt and provided at one end with a portion adapted to lap a frame member and clamp a floor board thereto, and a tongue integral with and struck up from the clip extending approximately diagonally from the plane of the clip toward the axis of said opening and with its free end spaced lengthwise of the clip far enough from the edge of the opening to permit a nut to be turned on said bolt by a socket wrench or the like, whereby said tongue is adapted to be bent toward the clip and into locking relation with said nut by a hammer blow or the like directed against the free end of the tongue, and said tongue having its base of greater width than its intermediate portion whereby said blow will tend to introduce greater curvature in the intermediate portion of the tongue than in its base portion.

4. A floor clip comprising a body portion having an opening therethrough adapted to receive a bolt and provided at one end with a portion adapted to lap a frame member and clamp a floor board thereto, and a tongue integral with and struck up from the clip extending approximately diagonally from the plane of the clip toward the axis of said opening and terminating at its free end in an edge including a straight line shoulder spaced lengthwise of the clip far enough from the edge of the opening to permit a nut to be turned on said bolt by a socket wrench or the like, whereby said tongue is adapted to be bent toward the clip by a hammer blow or the like to bring said straight line shoulder into locking relation with said nut, and said tongue having its base of greater width than its intermediate portion whereby said blow will tend to introduce greater curvature in the intermediate portion of the tongue than in its base portion.

5. A floor clip comprising a metal body portion having an opening therethrough adapted to receive a bolt and provided at one end with a portion adapted to lap a frame member and clamp a floor board thereto, and a tongue integral with and struck up from a recess in the clip extending from a tongue base line in a portion of the clip relatively remote from said opening to a line relatively close to said opening, leaving a portion of metal between said opening and recess, said tongue extending approximately diagonally from said base line toward the axis of said opening and terminating at its free end in an edge including a straight line shoulder having a notch therein for the reception of one corner of a nut, said shoulder being approximately normal to the length of the tongue and spaced lengthwise of the clip far enough from the edge of the opening to permit a nut to be turned on said bolt by a socket wrench or the like, whereby said tongue is adapted to be bent toward the clip by a blow from a hammer or the like to bring said shoulder into locking relation with a side of said nut.

6. A floor clip comprising a metal body portion having an opening therethrough adapted to receive a bolt and provided at one end with a portion adapted to lap a frame member and clamp a floor board thereto, and a tongue integral with and struck up from a recess in the clip extending from a tongue base line in a portion of the clip relatively remote from said opening to a line relatively close to said opening, leaving a portion of metal between said opening and recess, said tongue extending approximately diagonally from said base line toward the axis of said opening and terminating at its free end portion in an edge including a shoulder spaced lengthwise of the clip far enough from the edge of the opening to permit a nut to be turned on said bolt by a socket wrench or the like, whereby said tongue is adapted to be bent toward the clip by a blow from a hammer or the like to bring said shoulder into locking relation with a side of said nut.

SVEN J. STRID.